Figure 1:
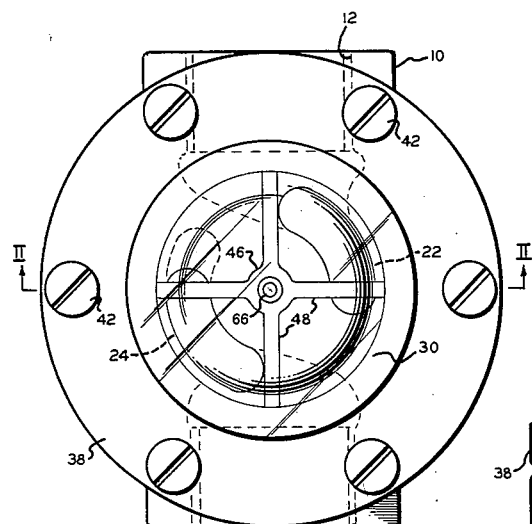

Oct. 22, 1963  R. O. MONROE ETAL  3,107,645
FLOW INDICATOR WITH SIGHT GLASS CLEANING ROTOR
Filed Oct. 30, 1961

INVENTOR
ROLLO O. MONROE
ERWIN F. TOBLER

BY Beaman & Beaman

ATTORNEY

United States Patent Office 3,107,645
Patented Oct. 22, 1963

3,107,645
FLOW INDICATOR WITH SIGHT GLASS
CLEANING ROTOR
Rollo O. Monroe and Erwin F. Tobler, both of Three
Rivers, Mich., assignors to The Johnson Corporation,
Three Rivers, Mich., a corporation of Michigan
Filed Oct. 30, 1961, Ser. No. 148,376
7 Claims. (Cl. 116—117)

The invention pertains to a fluid flow indicator and particularly relates to a fluid flow indicator of the visual type which may be employed with high temperature fluids, such as those encountered in steam condensate systems and the like.

Visual fluid flow indicators have long been employed in fluid systems for visually indicating the flow of fluid through a conduit, however, such flow indicating devices have not been commonly employed with high temperature fluids or fluids which are relatively opaque or contain foreign matter which tends to coat the observation window of the indicator and soon render the same opaque and useless for observation purposes. The invention pertains to a visual fluid flow indicator which may be employed with the aforementioned types of fluids and is particularly adaptable for use in the condensate outlet conduit of heat transfer equipment such as that used in paper making machines, corrugators, textile dry cans and the like. One of the problems encountered with visual flow indicators as used with steam condensate outlet lines lies in the fact that the window of the indicator often becomes clouded and eventually opaque due to the deposits of rust and other impurities of the water passing through the indicator which renders observation of the same difficult, if not impossible.

The fluid flow indicator of the invention incorporates an indicating rotor which rotates upon the occurrence of fluid flow and the rotor is provided with wiping edges which intimately engage with the inner surface of the window to maintain the window free of deposits and transparent. While the applicants are not the first to device a self-cleaning fluid flow indicator, the applicants' device is an improvement over indicators of the type shown in U.S. Patent No. 2,847,969 and the like.

It is therefore an object of the invention to provide a visual fluid flow indicator which may be employed with high temperature fluids wherein the operation of the indicator is not significantly adversely affected by the characteristics or temperature of the fluid.

A further object of the invention is to provide a fluid flow indicator which employs an easily observable rotor which engages the transparent observation window of the indicator during rotor rotation and maintains the same in a relatively clean condition.

A further object of the invention is to provide a visual fluid flow indicator employing an observation window cleaning rotor wherein the force of the fluid flowing through the indicator maintains the rotor in engagement with the window and the rotor has low friction characteristics to minimize the resistance to rotation thereof caused by the engagement with the window.

Yet another object of the invention is to provide a fluid flow indicator which employs a rotor which positively engages the observation window of the indicator during flow of the fluid such that a portion of the rotor will be visible even when employed with relatively opaque fluids.

Figure 3:
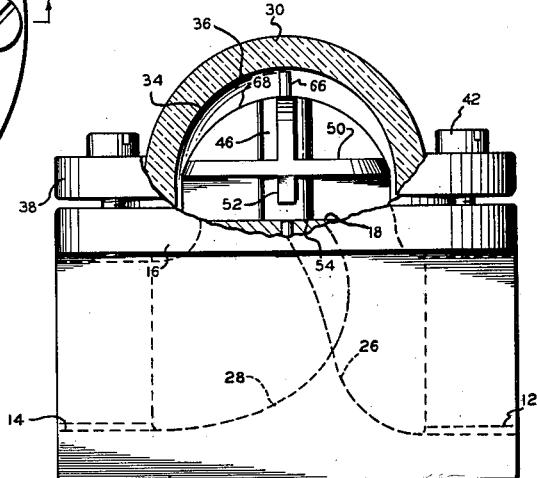
Figure 2:
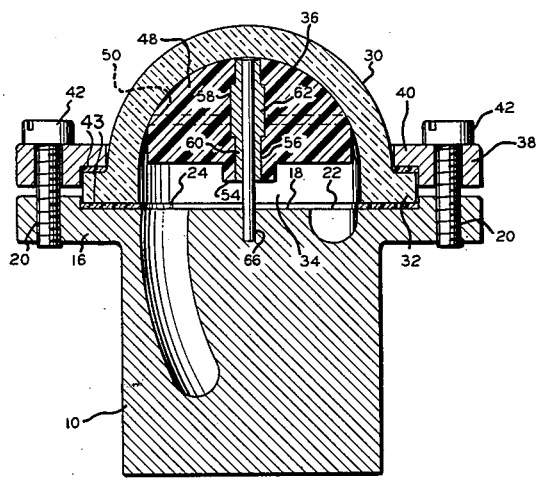
Figure 4:
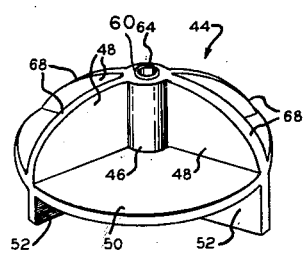

These and other objects of the invention arising from the details and arrangement of components of an embodiment thereof will become apparent from the following description and accompanying drawings wherein:

FIG. 1 is a top plan view of a flow indicator in accord with the invention,

FIG. 2 is an elevational sectional view of the fluid flow indicator in accord with the invention taken along section II—II of FIG. 1 showing the rotor in the operating position, FIG. 3 is a side elevational view of the indicator, a portion of the dome and body member being shown partly in section on a diameter of the dome illustrating the rotor in the rest position, and, FIG. 4 is a perspective view of the rotor employed with the invention.

The fluid flow indicator of the invention is adapted to be inserted anywhere in the conduit or pipeline containing the fluid flow to be indicated and for this purpose consists of a body member 10 having an inlet port 12 and an outlet port 14. For use with conventional threaded piping, the ports 12 and 14 are illustrated as being internally threaded, however, it will be appreciated that any type of conventional coupling means may be incorporated with the body member ports.

The lower portion of the body member 10 may be of rectangular configuration and the upper portion thereof is preferably provided with an integral circular planar flange 16. The upper surface of the body member is recessed in a circular manner at 18 to form a lower chamber surface and a plurality of equally spaced holes 20 are formed in the flange and threaded to receive fastening bolts, as will be later apparent. The recessed surface 18 is provided with a pair of kidney-shaped diametrically opposed openings 22 and 24, FIG. 1, each of which extend through an arc of substantially 90° of the circle defining the recess 18. The opening 22 communicates via a passage 26, FIG. 3, with the inlet port 12 and the opening 24 communicates via passageway 28 with the outlet port 14. The configuration of the passages 26 and 28 will be apparent from FIG. 3, wherein it will be observed that fluid entering the inlet port 12 passes through the opening 22 in an upward and tangential direction with respect to the recess 18. Likewise, the fluid passing through the opening 24 into the passage 28 leaves in a somewhat tangential direction to the configuration of the recess.

A substantially semispherical window or dome 30 having a peripheral outwardly extending edge 32 is received within the recess 18 to define a substantally semispherical fluid chamber 34. The window member 30 is preferably constructed of a temperature resistant glass, such as Pyrex, and the inner surface 36 thereof, which is contacted by the rotor, FIG. 2, is of a true spherical configuration.

The window glass or dome 30 is maintained upon the body member 10 by a ring 38 having a shoulder portion 40 which overlaps the window edge 32 and a plurality of holes are defined in the ring 38 to receive screws 42 which, cooperating with the threaded holes 20, maintain the ring and window assembled to the body member. For purposes of sealing, it is advisable that gasket material 43 or suitable sealing compound be located intermediate the adjacent window and body member and ring portions.

The rotor 44 of the indicator is best shown in FIG. 4 and includes a central hub portion 46 from which integral upper rib members 48 radially extend. A horizontally extending rotor portion 50 is integrally formed with the ribs 48 intersecting and extending at right angles thereto and transversely disposed to the axis of the hub 46. The portion 50 has an arcuate periphery which conforms to that of the inner dome surface 36 and preferably engages surface 36 during operation of the rotor. Lower rib portions 52 are defined as extensions of the ribs 48 on the underside of the portion 50, as illustrated in FIG. 4. The respective ribs 48 and 52 are located in 90° relationship with each other with regard to the axis of the hub and the entire rotor is preferably molded from a high temperature resistant synthetic material having a greater density than that of water and also, having easily moldable and low friction characteristics. One such composition of which the rotor may be constructed is tetrafluoroethylene as available under the trade name Teflon, made by the Du Pont Company.

The hub 46 of the rotor is provided with a lower end 54, FIG. 2, and two diametrically opposed ribs 52 extend downwardly to the extent wherein the lower edge of these ribs coincide with the lower end 54 of the rotor hub. The other rotor ribs 52 terminate short of the lower end of the hub as illustrated in FIG. 2.

The hub of the rotor is provided with a bore 56 having a central enlarged cylindrical recess 58, FIG. 2, and a brass insert sleeve 60, having a configuration similar to the bore of the rotor, is forced into the rotor bore 56 wherein the enlarged portion 62 of the sleeve is received within the recessed portion 58 to maintain the sleeve in position within the rotor. The sleeve 60 is provided with an axial bore 64 whereby the rotor may be rotatably mounted upon a stainless steel shaft 66 extending into the chamber 34 and mounted at one end to the body member 10. The upper edges 68 of the ribs 48 are formed in an arcuate manner of circular configuration which conforms to the arc of the inner window surface 36, FIG. 2, and these upper edges 68 function as the window cleaning portions of the rotor.

When there is no fluid flow through the indicator, the rotor will be in the position shown in FIG. 3 wherein the lower end 54 of the hub rests upon the surface of the recess 18. It will be noted that in this position, the rotor rib upper edges 68 are spaced from the inner surface of the window 30. Upon the flow of fluid through the body member 10 the fluid entering port 12 will be injected into the chamber in an upward and tangential direction to the configuration of the chamber and rotor and, due to the fact that two of the ribs 52 will be engaging with the recess surface 18, very little fluid flow will cause rotation of the rotor. The fact that the fluid is injected in an upward direction causes the fluid to impinge against the rotor portion 50 and axially slide the rotor along shaft 66 toward the window as well as cause rotation thereof. Therefore, during significant fluid flow, the rotor will be rotating while the rotor upper edges 68 are in engagement with the inner surface 36 of the window as shown in FIG. 2 and thus, the rotor rotation may be observed, and the edges 68 will keep the window free of foreign matter accumulation.

The fluid flowing through the opening 22 into the chamber 34 leaves the chamber through the opening 24 and as the passage 28 is provided with a return bend portion, the fluid flow through the body member is relatively nonrestricted and smooth. The fact that two of the rotor ribs 52 are not flush with the rotor lower end 54 aids in permitting an increased volume of fluid to be handled by the indicator. Should highly opaque fluids be employed with the indicator, the fact that the edges 68 intimately engage with the window would permit these edges of the rotor to be visible and, hence, fluid flow observed. In that the rotor 44 both rotates and axially translates upon the shaft 66 the likelihood of the rotor binding on the shaft due to the inclusion of foreign matter between the rotating parts is minimized and as the axis of the shaft 66 is disposed radially to the configuration of the inner window surface, a uniform and complete wiping of the inner window surface 36 is assured by the rotor ribs upper edges 68.

The indicator of the invention is easily disassembled for purposes of maintenance and it will be appreciated that other configurations of windows or glass domes other than that disclosed may be employed within the scope of the invention. During operation of the rotor, the rotor portion 50 confines most of the fluid flowing through the indicator to that chamber area defined by the rotor portion 50 and the recess surface 18 and, hence, turbulence and contact of the window surface by the fluid is reduced over prior constructions of visual fluid flow indicators.

It will be appreciated that other embodiments to the invention may be apparent to those skilled in the art without departing from the spirit and scope thereof and it is intended that the invention be defined only by the following claims.

We claim:

1. A fluid flow indicator comprising in combination, a body member having inlet and outlet passages defined therein, a chamber defined in said body member, a transparent window portion having an inner surface defining a portion of said chamber, said passages communicating with said chamber, a body member mounted shaft within said chamber extending toward said window, a rotor within said chamber intermediate said passages and window rotatively and axially movably mounted on said shaft, wiping surfaces defined on said rotor complementary in configuration to said window inner surface adapted to engage said surface and vanes defined on said rotor within said chamber acted upon by fluid flowing through said passages and chamber wherein fluid flow rotates and axially translates said rotor toward said window.

2. In a fluid flow indicator as in claim 1 wherein said window inner surface is of semispherical configuration and said wiping surfaces consist of circular arcs defined on ribs formed on said rotor.

3. In a fluid flow indicator as in claim 1 wherein said rotor is formed of a synthetic high temperature resistant material having a specific gravity greater than 1.

4. A fluid flow indicator comprising in combination, a body member having inlet and outlet passages defined therein, a chamber defined in said body member, a transparent window having an inner surface defining a portion of said chamber, a body member mounted shaft within said chamber extending toward said window, a rotor within said chamber rotatively and axially movably mounted upon said shaft, said passages communicating with said chamber through openings defined in said chamber, said openings being tangentially related with respect to said shaft, at least one wiping surface defined on said rotor complementary in configuration to said window inner surface and engageable therewith upon axial movement of said rotor toward said window, vanes defined on said rotor acted upon by fluid flowing through said chamber for rotating said rotor, and a rotor portion disposed transversely to said shaft and inlet passage opening acted upon by the fluid flow from said inlet passage causing the flowing fluid to bias said rotor toward said window.

5. In a fluid flow indicator as in claim 4 wherein said window inner surface is semispherical and said rotor portion disposed transversely to said shaft is interposed between said passage openings and said rotor wiping surface and is fluid impervious and includes a circular peripheral edge which engages said inner surface upon said wiping surface engaging said inner surface.

6. In a fluid flow indicator as in claim 4 wherein said rotor includes an elongated hub, said rotor portion disposed transversely to said shaft comprising a planar portion mounted on said hub perpendicularly disposed to the axis thereof, planar rib members perpendicularly intersecting said planar rotor portion formed on a common side thereof and commonly intersecting at a line coinciding with the axis of said hub, the outer surface of said rib members defining said wiping surface and said vanes constituting planar members perpendicularly intersecting said planar portion on a common side thereof opposite the side intersected by said rib members, said vanes commonly intersecting at a line coinciding with the axis of said hub.

7. A fluid flow indicator comprising in combination, a body member, inlet and outlet passages defined in said body member, a chamber defined on a portion of said body member, a transparent window having an inner surface defining a portion of said chamber, a body mounted shaft within said chamber extending toward said window, a rotor mounted on said shaft for rotative and axial movement thereto and wholly confined within said chamber, a window wiping surface and vanes defined on said rotor, said passages communicating with said chamber at a location disposed in opposed relation to said window and on the opposite side of said rotor with respect to said window whereby fluid flow through said passages rotates said rotor and axially biases and translates said rotor toward said window engaging said inner and wiping surfaces.

References Cited in the file of this patent

UNITED STATES PATENTS 2,387,805     Olsen _____ Oct. 30, 1945